United States Patent [19]
Ferris et al.

[11] Patent Number: 4,797,064
[45] Date of Patent: Jan. 10, 1989

[54] COMPOSITE HELICOPTER ROTOR HUB

[75] Inventors: Donald L. Ferris, Newtown, Conn.; Francis E. Byrnes, White Plains, N.Y.

[73] Assignee: United Technologies Corporation, Hartford, Conn.

[21] Appl. No.: 80,370

[22] Filed: Jul. 30, 1987

[51] Int. Cl.[4] .............................. B64C 11/06
[52] U.S. Cl. ............................ 416/134 A; 416/230; 416/244 R
[58] Field of Search ............ 416/134 A, 230 A, 114, 416/244 D

[56] References Cited

U.S. PATENT DOCUMENTS

| 4,195,967 | 4/1980 | Weiland | 416/230 A X |
|---|---|---|---|
| 4,425,082 | 1/1984 | Mussi et al. | 416/134 A X |
| 4,483,214 | 11/1984 | Mayer | 416/134 A X |
| 4,512,717 | 4/1985 | Pancotti et al. | 416/134 A |
| 4,516,909 | 5/1985 | Caramaschi et al. | 416/134 A |
| 4,521,157 | 6/1985 | Caramaschi et al. | 416/134 A |
| 4,556,365 | 12/1985 | Mouille et al. | 416/230 A X |
| 4,568,245 | 2/1986 | Hibyan et al. | 416/230 A X |
| 4,652,211 | 3/1987 | Castelli et al. | 416/140 A |
| 4,666,753 | 5/1987 | Matuska et al. | 416/143 X |

Primary Examiner—Everette A. Powell, Jr.

[57] ABSTRACT

A fiber reinforced braided composite main helicopter rotor hub retention plate whose fiber orientation withstands forces both in the plane of the retention plate and normal to the plane. The retention plate comprises a fiber reinforced resin braided tubular ring having substantially circumferential fibers interwoven with angled fibers disposed about a central core. Arms extend inward from the braided ring for attachment to a driveshaft.

14 Claims, 4 Drawing Sheets

COMPOSITE HELICOPTER ROTOR HUB

TECHNICAL FIELD

The field of art to which this invention pertains is helicopter rotor hubs and particularly rotor hubs comprising fiber reinforced epoxy matrix composite.

BACKGROUND ART

Historically, helicopter main rotor hubs have been made of high strength, lightweight, critical metals or alloys. Although these metal components have performed adequately, there are a number of drawbacks inherent to these materials. Three important areas where these materials possess less than optimum features are weight, availability and damage tolerance.

Weight has always been a consideration in helicopter construction and with increasing fuel costs it has become a primary objective, i.e. to reduce the weight of the overall helicopter by using lighter materials. At present aluminum and titanium are used extensively because of their light weight and strength, however, there is a constant search for lighter and stronger materials. In addition, these lightweight metals are classified as "critical" materials with their primary availability being through importation. As has been demonstrated by the oil embargoes of past years, reliance on foreign sources for these materials is not desirable. Furthermore, these metals do not impart a damage tolerance to their components. That is, when a metal component starts to weaken, through fatigue or otherwise, cracks are generated. These cracks continue to grow quickly as there is nothing to stop their propagation and the component part can fail completely. As can be appreciated, this lack of damage tolerance can be disastrous in a helicopter.

In order to overcome the shortcomings of such metal components, the industry has taken two approaches. One is o build a redundant component so that should one fail, the other will allow for safe landing. The second is to overdesign the particular part such that it would have much greater strength than would normally be required under normal circumstances. Both of these approaches add weight to the aircraft as well as increased cost and reliance on critical metals.

Recently, composite materials have been used as replacement parts for many metal components due to their light weight and relatively low cost. For example, composite materials are now being used in main structural components such as main rotor blades and tail rotor assemblies on helicopters. However, it is not always practical to replace a metal component with a composite material due to particular design considerations and shortcomings in the composite physical properties.

Composite rotor hubs have been designed using a laminated structure of fiber reinforced resin (e.g., note British Patent No. 2,092,541). Such hubs are of such complicated design as to make them costly to fabricate, and having fewer component parts, produce an increased number of failure points. Commonly assigned U.S. Pat. No. 4,568,245 describes another composite main rotor hub.

However, there is still a constant search in this art for damage tolerant, relatively inexpensive and lightweight composite components capable of withstanding the forces developed in a helicopter rotor hub assembly.

DISCLOSURE OF INVENTION

This invention is directed to a fiber reinforced braided composite main helicopter rotor hub retention plate whose fiber orientation withstands forces both in the plane of the retention plate and normal to the plane. The retention plate comprises a fiber reinforced resin braided tubular ring having substantially circumferential fibers interwoven with angled fibers disposed about a central core. Arms extend inward from the braided ring for attachment to a driveshaft.

This invention makes a significant advance in the field of composite helicopter rotor hubs by providing a damage tolerant retention plate that includes triaxial braided fibers to withstand the forces a retention plate is typically subjected to.

The foregoing and other objects, features and advantages will be apparent from the specification, claims and from the accompanying drawings which will illustrate an embodiment of the invention.

BEST MODE FOR CARRYING OUT THE INVENTION

Typically, graphite fiber is used as the reinforcement. A high strength graphite fiber may be used which has a minimum filament modulus of $30 \times 10^6$ psi. The individual fibers are generally about 0.35 to about 0.4 mil in diameter. Preimpregnated graphite fiber may be purchased from Narmco Materials, Inc. (Anaheim, Calif.) in sheet or continuous tape form. It is preferred that the cured graphite/resin composite should contain about 60% fibers by volume. Although percentages as high as 65% and as low as 55% may be tolerated without affecting the mechanical properties.

Preferably, a resin such as epoxy should be selected so as to be compatible with the fiber reinforcement. It is also desirable that the resin be satisfactorily curable at low pressures (i.e., about 20 to about 100 psig). One such resin system, Dow Tactax 123 TM Resin and Dow Tactax TM H41 hardener, is available from Dow Industries.

Triaxial braided composites are critical to this invention. Triaxial interwoven braided fibers result in an integral component that has no bond lines such as are present in conventional laminate composites (e.g., commonly assigned U.S. Pat. No. 4,568,245). Thus, primary loads resulting from centrifugal forces and shear forces due to lift are reacted by the fibers in the ring and not by the resin matrix. Triaxial braided tubular composite material has been available, for example, from Fiber Innovations, Inc. (Norwood, MA). Alternatively, a continuous ring braider may be modified to form a split bed braider suitable for braiding continuous tubular rings. A continuous ring braider such as that available from the New England Butt Division of Wardwell Braiding Machine Company (Central Falls, R.I.) is cut across a diameter to form two half-rings. The two half-rings are attached with a hinge (to reform the ring) so that the bed may be opened to allow removal of the braided ring from the bed. A locking mechanism is provided to keep the half-rings joined together during operation.

Figure 1:
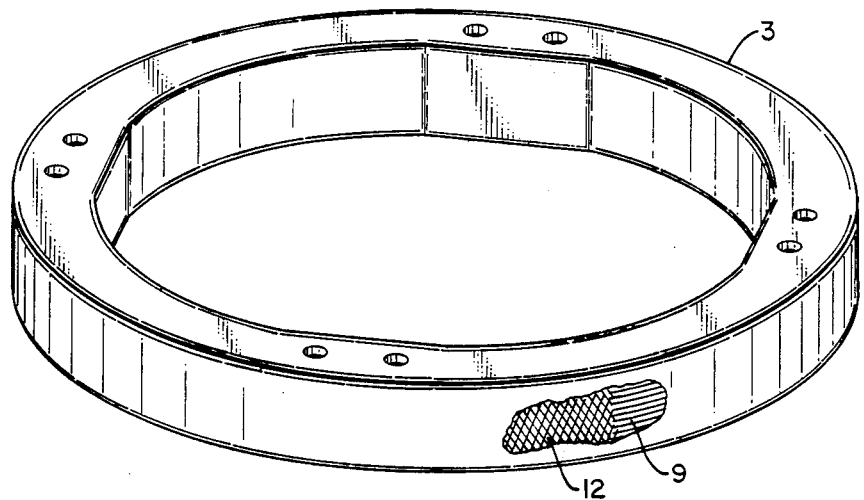
FIGS. 1, 2 and 3 illustrate exemplary retention plates for a main helicopter rotor hub.
Figure 2:
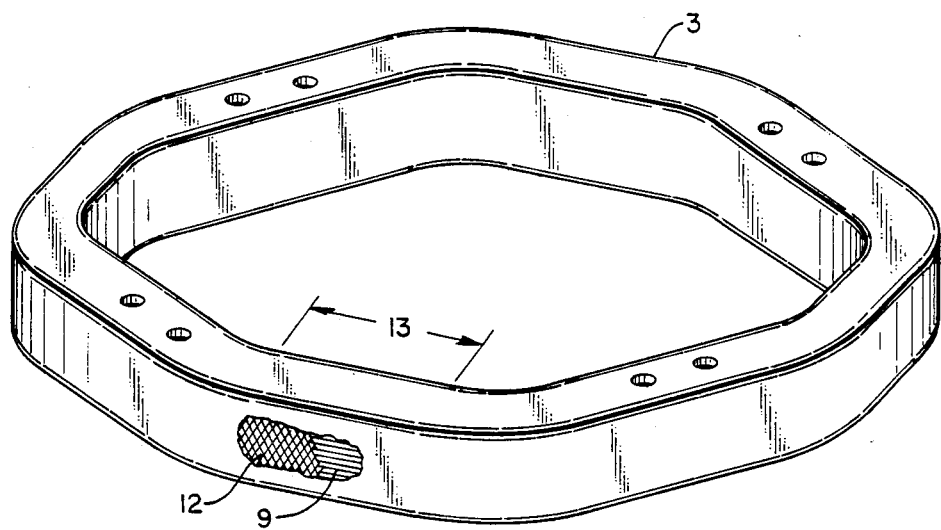
Figure 3:
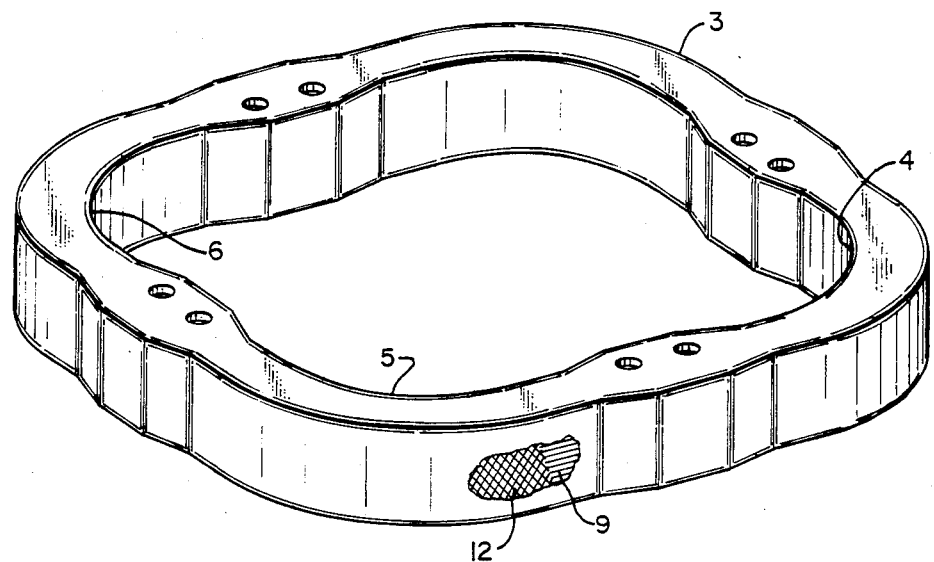

FIGS. 1, 2 and 3 illustrate several exemplary shapes (e.g., circular, square, octagonal) for the tubular ring member. A nonstructural flyaway material (e.g., chopped fiberglass reinforced epoxy) may be used as the mandrel for the braided tubular ring 3. Alternatively, the ring member may have a permanent mandrel such as a composite and metal structure having the desired shape of the finished ring member. The mandrel may be a filament wound composite over a metal form to produce a continuous tubular ring (e.g., circular, square, octagonal) of composite windings. The mandrel is cured and the inner surface of the tubular composite ring may be removed allowing the tool mandrel to be removed, leaving a C-section composite ring which is hollow in the inner open area of the circular ring. Metal or chopped blocks of composite can be inserted and bonded in the open C-section of the ring to reinforce the mandrel, for example, where the arms or elastomeric bearings described below may be attached. The remaining open areas of this C-section ring mandrel can be filled with a lightweight, nonstructural closed cell foam.

The braided ring 3 preferably has a substantially rectangular cross-section because that provides increased surface area for bonding between the parts described below (e.g., between the rings and the arm means flanges). In addition, it is preferred that the rings are substantially circular (e.g., do not have corners). Corners can be difficult to braid and can result in bunching of fibers whereas curved rings result in a constant fiber resin ratio throughout a cross-section.

The braided tubular ring 3 has a triaxial braid comprising circumferential fibers 9 interwoven with angled fibers 12 oriented at about 30° to about 60° with respect to the circumferential fibers 9. The circumferential fibers 9 are preferably coplanar with the braided ring 3, however, minor deviations from 0° (e.g., ±5°) can be tolerated. Above about 10° off axis the circumferential fibers have a reduced capability to withstand the centrifugal forces that the retention plate is subject to, resulting in a degradation in strength. Below about 30° and above about 60°, the angled fibers 12 are not as effective in reacting the transverse shear forces (e.g., caused by lift as a tensile load) that can cause delamination. For example, it was found that conventional composite laminate retention plates can delaminate when subjected to bending fatigue testing.

The braided tubular rings may be placed in a suitable resin transfer mold and impregnated with resin in a conventional transfer molding apparatus and processed at temperatures, pressures and times suitable for the particular resin used. Alternatively, prepreg braid may be cured. FIG. 1 details a circular or near circular braided tubular ring 3. An alternative configuration having an octagonal shape is illustrated in FIG. 2. The arms and bearing structures described below can be attached to the braided tubular ring along alternating sides of the octagon. This provides a straight or near straight section 13 for bearing structures to rest against in contrast to the other configurations (e.g., circular).

FIG. 3 illustrates another exemplary braided tubular ring 3 configuration. The braided tubular ring 3 is (geometrically) shaped so that at least three points, 4, 5, 6, spaced equidistantly about the ring's inner surface, are disposed farther from the ring's center, than a midpoint between any two of the above-identified contiguous points along the ring, is disposed from the ring's center. The number of points being chosen to correspond to the number of arms. The practical result of this shape being that a radial arm structure having slots at the end (e.g., outboard end) of the arms (described below) can be inserted within the braided tubular ring (coplanar with the ring) and twisted so the slots accept the braided tubular ring.

Figure 4:
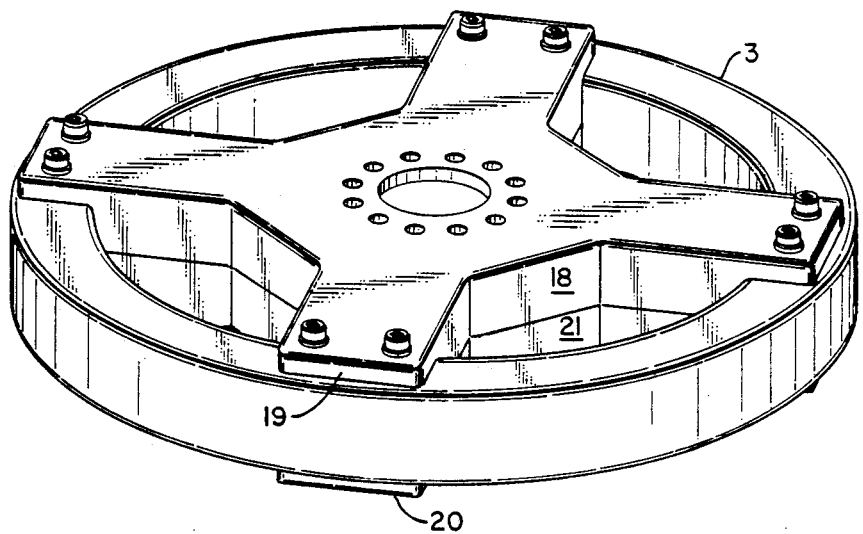
FIGS. 4, 5, and 6 illustrate the retention plates illustrated in FIGS. 1, 2 and 3 and include exemplary radial arm means for attaching the retention plate to the drive shaft.
Figure 5:
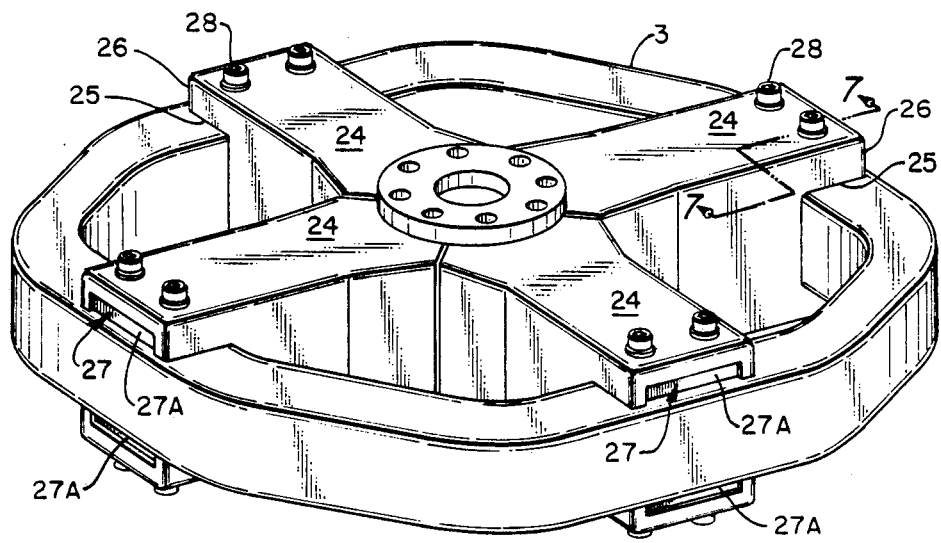
Figure 6:
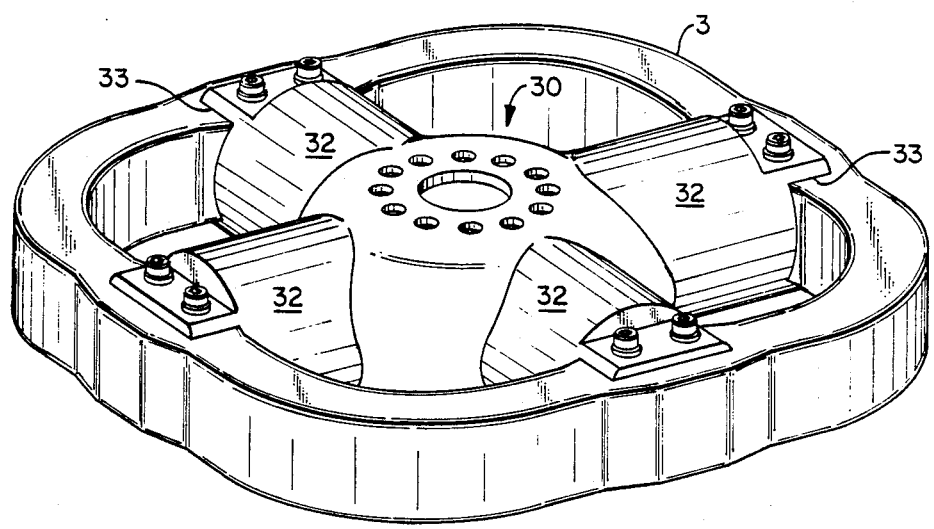

FIGS. 4, 5 and 6 illustrate the above exemplary braided tubular rings and include exemplary arm means 15, 18, and 21, respectively, for attaching the ring 3 to a helicopter driveshaft that is coexistent with the central axis 18. Typically, the arm means are through bolt connected to upper and lower flanges which are attached to driveshaft flanges. Although these arm structures have bee matched with a particular braided tubular ring configuration, a variety of alternative matched structures are possible.

FIG. 4 illustrates upper and lower composite laminate cruciforms 18, 21, that are disposed on opposite sides of the ring 3, and have flanges 19 and 20 that overlap the ring 3 and are joined to each other and the ring 3.

Alternatively, as illustrated in FIG. 5, a plurality of filament wound composite arms 24 having slots 25 at their outboard end for receiving the ring 3 may be used. Since the arms 24 are separate, they may be slid into place so that the slots accept the ring 3. The radial arms 24 are substantially rectangular in section and are filament wound over a removable mandrel. Flange areas 26 of the arm slots 25 can be strengthened by adding flat layers of composite interleaved between wound layers. The radial arm wound fibers are oriented substantially ±45° on both top and bottom surfaces of the radial arms, to react the edgewise torque of the rotor shaft to the rotor blades. The fiber orientation of the two vertical sides of the radial arms is also substantially ±45° to react the lift loads of the rotor on the radial arms. The radial arms are individual in nature but may be filament wound in opposite pairs, and trimmed to fit around the central rotor shaft. The radial arms are substantially higher in section than the surrounding braided tubular ring and may be notched or cut out in their vertical wall section to form a slot 26. Thus, the braided tubular ring is overlapped on its top and bottom surfaces and fastened vertically through the upper and lower flanges 26 of the radial arms and the braided tubular ring 3 top and bottom surfaces.

Figure 7:
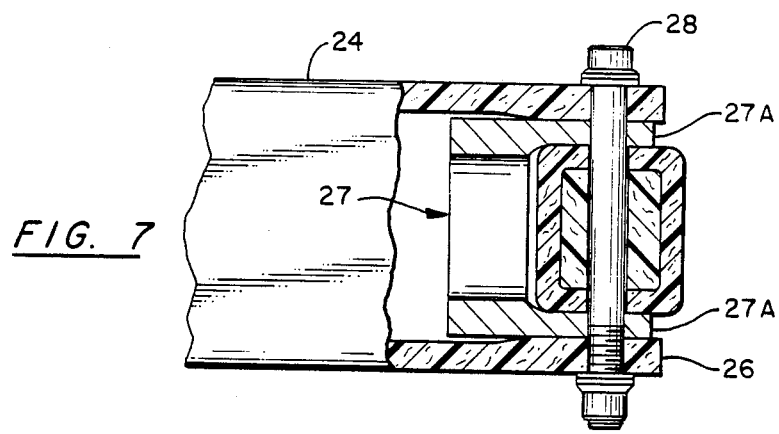
FIG. 7 is a view taken along the line 7—7 of FIG. 5.

According to FIG. 7, between the braided tubular ring 3 and the radial arms 24, a flanged metal sleeve 27 can be inserted in the outer end of a radial arm 24, to bear against the inside surfaces of the radial arm. Metal flanges 27A of this sleeve extend above and below the braided tubular ring and arm and are disposed between the outer end flanges of the radial arms 26 and the braided tubular ring 3. The metal flanges 27 help carry the lift loads of the blades from the braided tubular ring through the radial arms and into the main rotor shaft. Vertical fasteners 28 attaching the braided tubular ring 3 to the radial arms 24 also attach through the flanges of the metal sleeves.

Figure 8:
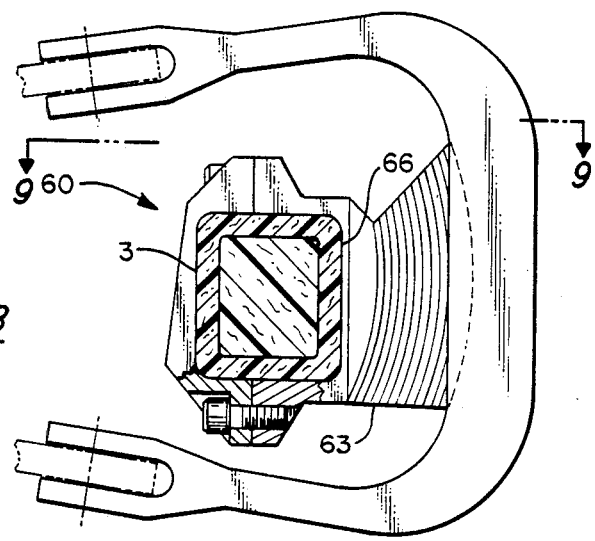
FIG. 8 illustrates a bearing assembly for supporting a yoke attached to the ring which is cross-sectioned.
Figure 9:
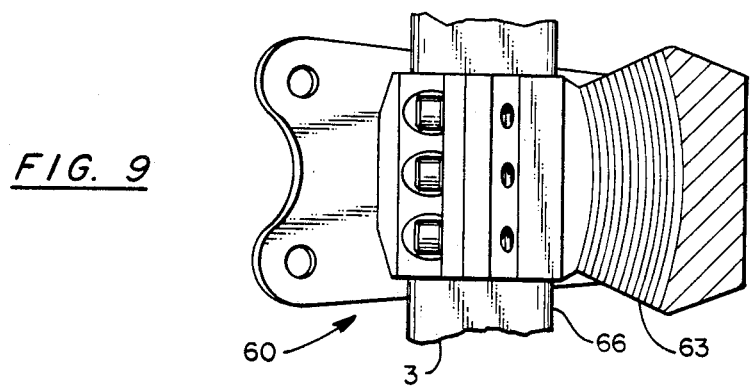
FIG. 9 is a section taken through the line 9—9 of FIG. 8.

FIGS. 8 and 9 illustrate a bearing assembly means 60 particularly adapted for use with the configuration illustrated in FIG. 5, although it may be used with other configurations. It comprises a spherical segmented elastomeric bearing 63 disposed between the radial arms and against the inner surface 66 of the braided tubular ring 3 and supporting at its outer end a yoke. The focal point of pivot of this bearing is exterior to the braided tubular ring. This bearing executes the typical motions of the rotor blade (e.g., flapping, lead and lag, pitching).

Yet another exemplary configuration is illustrated in FIG. 6 where a plurality of arms 32 form a radial arm structure 30, each arm 32 having a slot 33 for accepting the braided tubular ring 3. This structure is particularly adapted to a braided tubular ring 3 such as in FIG. 3 where the ring 3 has a shape so that the radial arm structure 30 can be inserted into the braided tubular ring 3 (so that their planes are coplanar) and twisted so that the braided tubular ring 3 fits within each of the radial arms 32 slots 33.

The braided tubular ring and arms form a composite main rotor head braided plate hub that may be attached to the helicopter blades by a conventional yoke/torque box/pitch horn and damper assembly.

This braided composite rotor hub withstands both forces in-plane and normal to said plane. Importantly, it withstands interlaminar shear forces that can delaminate conventional composite laminates.

This invention provides a hub system that uses a minimum number of fasteners, thus reducing fretting between bolted surfaces and minimizing field problems on assembly and disassembly. In addition, if one component of the rotor hub structure is damaged, the rest may be salvageable. The rotor hub transfers flap, head moment, and lift capability through lightweight radial hub arms to the rotor shaft using the most efficient section properties. Critically, this braided composite design provides a substantially larger enough section gaining greater ballistic survivability over a comparable metal hub. Also, the hub is a lightweight, low profile composite structure which reacts centrifugal force through a hoop ring from blade to blade.

Although the invention has been shown and described with respect to detailed embodiments, it should be understood by those skilled in the art that various changes and omissions in form and detail may be made therein without departing from the spirit or scope of this invention.

We claim:
1. A main helicopter rotor hub having a retention plate, said retention plate comprising:
  (a) a fiber reinforced braided tubular ring said fiber reinforced resin braided tubular ring having substantially circumferential fibers interwoven with angled fibers oriented at a predetermined angle to said: circumferential fibers said circumferential and angled fibers disposed about a central core; and
  (b) arm means for attaching said braided ring to a driveshaft said arm means extending inwardly from said braided ring; wherein said fiber orientation withstands forces both in the plane of said retention plate and normal to said plane.

2. The main helicopter rotor hub as recited in claim wherein said fibers are oriented at an angle of about 30° to about 60° with respect to said substantially circumferential fibers.

3. The main helicopter rotor hub as recited in claim wherein said fiber reinforced braided tubular ring has a substantially square cross-section.

4. The main helicopter rotor hub as recited in claim wherein said fiber reinforced braided tubular ring has an internal filament wound mandrel.

5. The helicopter rotor hub as recited in claim 1 wherein said arm means has a flange for attachment to said braided tubular ring.

6. The helicopter rotor hub as recited in claim 5 wherein said arm means has a reinforcing metal sleeve having flanges that are disposed between said arm flange and said braided tubular ring.

7. The helicopter rotor hub as recited in claim 1 wherein said inwardly extending are means comprises a plurality of arms, each arm having a horizontal slot for accepting said braided ring.

8. The main helicopter rotor hub as recited in claim 1 wherein said braided ring's inwardly facing surface is substantially equidistant from said braided ring's center.

9. The main helicopter rotor hub as recited in claim 1 wherein said inwardly extending radial arms form a lower cruciform and an upper cruciform said cruciforms disposed on opposite sides of said braided tubular ring.

10. The main helicopter rotor hub as recited in claim 1 wherein said radial arm structure comprises a filament wound composite.

11. The main helicopter rotor hub as recited in claim wherein said braided tubular ring has an inner surface such that at least three location points, the number of said location points corresponding to the number of radial arms, spaced equidistant about said ring's inner surface, are disposed farther from said ring's center than a point between any two contiguous location points along said ring, is disposed from said ring's center.

12. The main helicopter rotor hub as recited in claim wherein:
  (a) said inwardly extending radial arm means form a radial arm structure and each arm has a horizontal slot for accepting said braided tubular ring; and
  (b) said braided tubular ring has a shape capable of accepting said radial arm structure by turning said radial arm structure within and coplanar with said braided tubular ring so that said slots accept said braided tubular ring.

13. The main helicopter rotor hub as recited in claim wherein said braided tubular ring has internal attachment means displaced symmetric about said ring.

14. The main helicoper rotor hub as recited in claim wherein said inwardly extending arms have attachment means for joining said driveshaft.

* * * * *

UNITED STATES PATENT AND TRADEMARK OFFICE
CERTIFICATE OF CORRECTION

PATENT NO. : 4,797,064

DATED : January 10, 1989

INVENTOR(S) : Donald L. Ferris and Francis E. Byrnes

It is certified that error appears in the above-identified patent and that said Letters Patent is hereby corrected as shown below:

Column 3, line 59, "cured" should be --used--.

Column 4, line 15, "15, 18, and 21" should be --18/21, 24, and 32--.

Column 4, line 20, "bee" should be --been--.

Column 5, line 25, "interlaminar" should be --flapwise--.

Column 6, line 4, before "wherein" insert --1--.

Column 6, line 8, before "wherein" insert --1--.

Column 6, line 11, before "wherein" insert --1--.

Signed and Sealed this

Twenty-seventh Day of June, 1989

Attest:

DONALD J. QUIGG

*Attesting Officer*  *Commissioner of Patents and Trademarks*

UNITED STATES PATENT AND TRADEMARK OFFICE
CERTIFICATE OF CORRECTION

PATENT NO. : 4,797,064

DATED : January 10, 1989

INVENTOR(S) : Donald L. Ferris and Francis E. Byrnes

It is certified that error appears in the above-identified patent and that said Letters Patent is hereby corrected as shown below:

Column 6, Claim 2, line 3, after "claim" insert --1--.

Column 6, Claim 3, line 7, after "claim" insert --1--.

Column 6, Claim 4, line 10, after "claim" insert --1--.

Column 6, Claim 11, line 35, after "claim" insert --1--.

Column 6, Claim 12, line 43, after "claim" insert --1--.

Column 6, Claim 13, line 53, after "claim" insert --1--.

Column 6, Claim 14, line 56, after "claim" insert --1--.

Signed and Sealed this

Fourth Day of December, 1990

Attest:

HARRY F. MANBECK, JR.

*Attesting Officer*        *Commissioner of Patents and Trademarks*